United States Patent
Kulkarni

[11] 3,963,823
[45] June 15, 1976

[54] MOLYBDENUM RECOVERY FROM SPENT ACID SOLUTION

[75] Inventor: Avinash D. Kulkarni, Montclair, N.J.

[73] Assignee: Westinghouse Electric Corporation, Pittsburgh, Pa.

[22] Filed: Feb. 25, 1975

[21] Appl. No.: 552,835

[52] U.S. Cl. .................................... 423/56; 423/58; 423/593
[51] Int. Cl.² ................... C01G 39/00; C22B 34/34
[58] Field of Search .............. 423/56, 58, 61, 593, 423/55

[56] References Cited
UNITED STATES PATENTS

| | | |
|---|---|---|
| 1,250,063 | 12/1917 | Westling .............................. 423/56 |
| 1,948,407 | 2/1934 | Watts .................................... 423/55 |
| 3,393,971 | 7/1968 | Vanderpool et al. ................. 423/55 |

Primary Examiner—Herbert T. Carter
Attorney, Agent, or Firm—W. D. Palmer

[57] ABSTRACT

Dissolved molybdenum is recovered from spent sulfuric acid-nitric acid solution by adding ammonium hydroxide to spent acid solution to raise pH thereof to from about 1.5 to about 3, and preferably from 2 to 3. Solution is then agitated and simultaneously heated at a temperature less than about 95°C until substantially all dissolved molybdenum is precipitated as ammonium molybdate complex, from which the precipitate is then recovered.

3 Claims, 2 Drawing Figures a# MOLYBDENUM RECOVERY FROM SPENT ACID SOLUTION

BACKGROUND OF THE INVENTION

This invention relates to recovery of dissolved molybdenum from spent acid solutions and, more particularly, to recovery of dissolved molybdenum from a spent solution of mixed sulfuric acid-nitric acid, with the recovered molybdenum being in a high purity form suitable for use.

In the processing of tungsten filament coils and especially so-caled coiled coils, a very fine tungsten wire is wrapped about a small molybdenum mandrel to form a first coil. The coiled tungsten and molybdenum mandrel are then wrapped about a second mandrel so that the tungsten is in the form of a coil which in turn is formed into a coil. The formed coiled-coil is then slipped off of the largest mandrel, leaving the first molybdenum mandrel in place within the turns of the smaller tungsten coil. After cutting to size, this member is immersed in a solution of mixed sulfuric acid and nitric acid which dissolves the retained molybdenum mandrel leaving the coiled-coil tungsten intact. The resulting coiled-coil of tungsten is then in a form suitable fo use, such as a filament for an electric lamp. A molybdenum mandrel is also used in the manufacture of single coil lamp filaments.

The relative concentrations of the mixed sulfuric acid and nitric acid are subject to some variation and a mixed acid solution of sulfuric acid (normality of 13) and nitric acid (normality of 7) has been found to be very suitable. When this acid solution has sufficient molybdenum dissolved therein so that the molybdenum is present in amount of from about 40 grams to 75 grams per liter of acid solution, the rate of molybdenum dissolution becomes sufficiently slow that the acid is regarded as "spent". In the usual practices of the prior art, this spent acid solution has suitably been treated and then discarded, since it has not been economical to recover the dissolved molybdenum.

SUMMARY OF THE INVENTION

There is provided a method of recovering molybdenum in a form substantially free from other metallic contaminants from a mixed sulfuric acid-nitric acid aqueous solution having substantial quantities of molybdenum dissolved therein, wherein ammonium hydroxide is added to the acidic solution to raise the pH thereof to a value of from about 1.5 to about 3, and preferably from 2 to 3. The resulting partially neutralized solution is agitated while maintained in a heated condition at a temperature less than about 95°C and the solution is maintained under these conditions of heating and agitation for a sufficient time to precipitate therefrom substantially all dissolved molybdenum as ammonium-molybdenum complex. Thereafter, the resulting precipitate is separated from the residual solution.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENT

Figure 1:
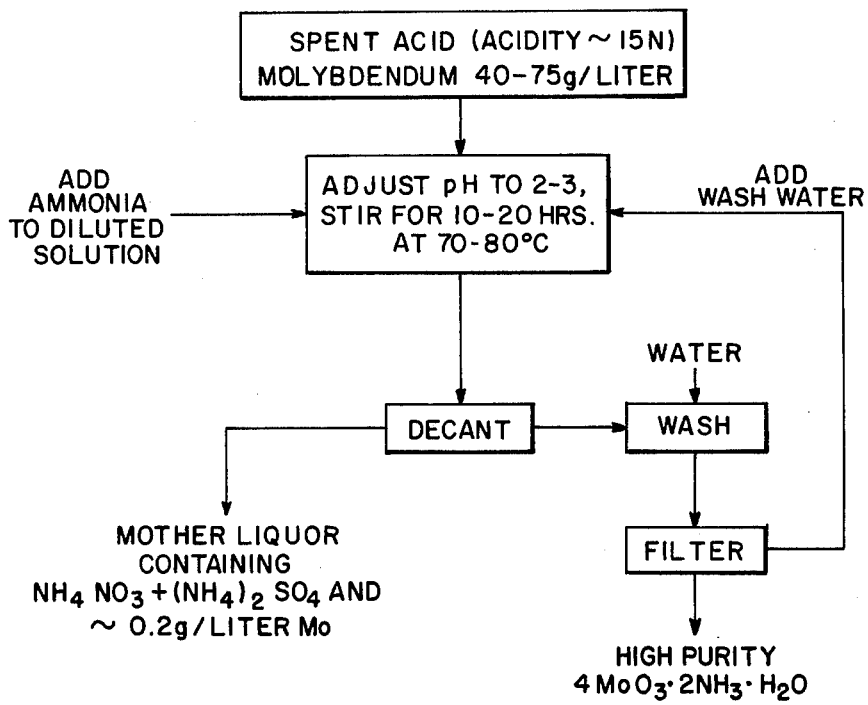
FIG. 1 is a flow diagram setting forth the steps of the present method.

The basic steps of the preferred embodiment of the process are shown in FIG. 1. The process will be considered on a production-scale basis wherein the reaction container is a conventional 1000 gallon capacity (3,785 liters) glas-lined tank, with suitable heating and stirring mechanism. The spent acid as described hereinbefore has a normality about 15 and is maintained in a holding tank until two hundred gallon (757 liters) are accumulated. The acid is then transferred to the reaction tank or container. Upon loading into the reaction tank, the spent acid is diluted with an equal volume of water, so that the total volume of diluted acid in the reaction tank is 400 gallons (1,514 liters). To the diluted spent acid solution is added concentrated ammonium hydroxide (28% $NH_3$) while constantly agitating the solution. The exothermic nature of the reaction will raise the solution temperature to about 80°C.

The concentrated ammonium hydroxide solution is added to the solution until the pH thereof has a value of from about 1.5 to about 3, and preferably from 2 to 3. As a specific example, for a batch of diluted spent acid of the foregoing proportions, approximately 700 liters of concentrated ammonium hydroxide will be added in order to achieve a solution pH of 2.5.

The resulting partially neutralized solution is then agitated by stirring while maintaining the solution in a heated condition such as by steam heating the reaction tank at a temperature of less than about 95°C. Preferably the solution temperature is maintained at from 70°C to 80°C with constant solution agitation for a period of at least about ten hours and preferably from 10 to 20 hours. This will cause substantially all dissolved molybdenum to precipitate from the spent acid solution as ammonium molybdate complex ($4MoO_3 \cdot 2NH_3 \cdot H_2O$). The resulting precipitate is then separated from residual solution by conventional decantation and filtering.

Figure 2:
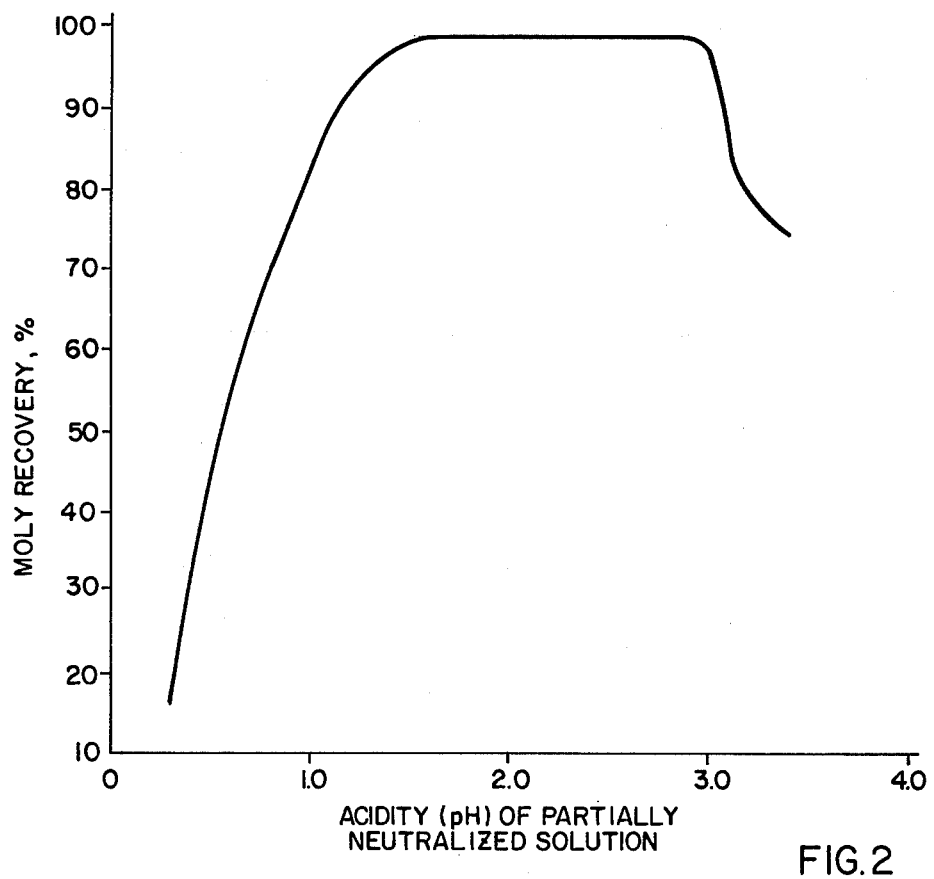
FIG. 2 is a graph of percent molybdenum recovery versus acidity (pH) of the partially neutralized spent acid solution.

In FIG. 2 is shown the affect on percent molybdenum recovery versus acidity of the partially neutralized solution, after the ammonium hydroxide addition. When the acidity of the solution is such that the pH is less than about 1.5, the precipitate tends to be very fluffy and difficult to recover by filtering. When the pH is from 2 to 3, the precipitate is of very high purity, crystalline, white in appearance, relatively dense, and easy to remove by conventional filtering. When the pH of the solution is increased beyond about 3, the molybdenum recovery drops rapidly and when the pH exceeds 4.5, no appreciable molybdenum recovery is obtained.

The acidity of the spent acid solution during the course of precipitation of the molybdenum does not change significantly and in a typical run, the variation in pH is around 0.1. This insures a uniform quality of the resulting product and for all practical purposes, all of the molybdenum dissolved in the spent acid is recovered. The resulting material has a very high purity and total metallic impurities are limited to less than about 100 parts per million. The resulting ammonium molybdate complex which is obtained is highly soluble in a basic medium and ammonium paramolybdate can be very conveniently made from an aqueous solution obtained by dissolving the ammonium molybdate complex in an ammonium hydroxide solution. The ammonium molybdate complex precipitate can also be used as a source of molybdate ion in aqueous solution, if desired.

The precipitate which is obtained is desirably washed with deionized water which may re-dissolve a small amount of the ammonium molybdate precipitate. This dissolved material can be readily recovered by using the resulting wash water to dilute the spent acid solution, prior to the partial neutralization step as shown in FIG. 1.

From a production standpoint, for every batch of 200 gallons (757 liters) of spent acid, 185 gallons (700 liters) of concentrated ammonium hydroxide are required to recover approximately 170 pounds (77 Kgs) of high purity ammonium molybdate complex wherein the molybdenum oxide content exceeds 90%. In addition, the residual partially neutralized solution or mother liquor contains approximately 1800 pounds (815 Kgs) of ammonium sulfate and ammonium nitrate salt mixture which can also be recovered, if desired, using a evaporation technique. The mother liquor contains only about 0.2 gram per liter of residual molybdenum.

I claim:

1. The method of recovering molybdenum in a form substantially free from other metals from a mixed sulfuric acid-nitric acid aqueous solution having substantial quantities of molybdenum dissolved therein, and which mixed acid solution has been used to dissolve molybdenum mandrels from coiled tungsten filaments, which method comprises:
   a. adding sufficient ammonium hydroxide to said acidic solution to partially neutralize same and raise the pH thereof to a value of from about 1.5 to about 3;
   b. agitating the resulting partially neutralized solution while maintaining same in a heated condition at a temperature less than about 95°C, and maintaining said solution agitation and said solution heated condition for a predetermined period of time sufficient to precipitate therefrom substantially all dissolved molybdenum as ammonium molybdate complex; and
   c. separating the resulting precipitate from residual solution.

2. The method specified in claim 1, wherein the pH of said partially neutralized solution is from 2 to 3, said solution during said agitation is heated to a temperature of from about 70°C to 80°C, and said simultaneous agitation and heating of said solution is continued for a period of at least about 10 hours to precipitate said ammonium molybdate complex.

3. The method as specified in claim 2, wherein said mixed acid solution initially comprises a mixture of sulfuric acid solution of normality of about 13 and nitric acid solution of normality of about 7, and said mixed acid solution prior to recovery of molybdenum therefrom has molybdenum dissolved therein in amount of from about 40 to 75 grams per liter of said acid solution.

* * * * *